L. P. WORRALL.
MEANS FOR ATTACHING TIRES TO DEMOUNTABLE RIMS.
APPLICATION FILED JULY 31, 1920.
1,403,141.
Patented Jan. 10, 1922.
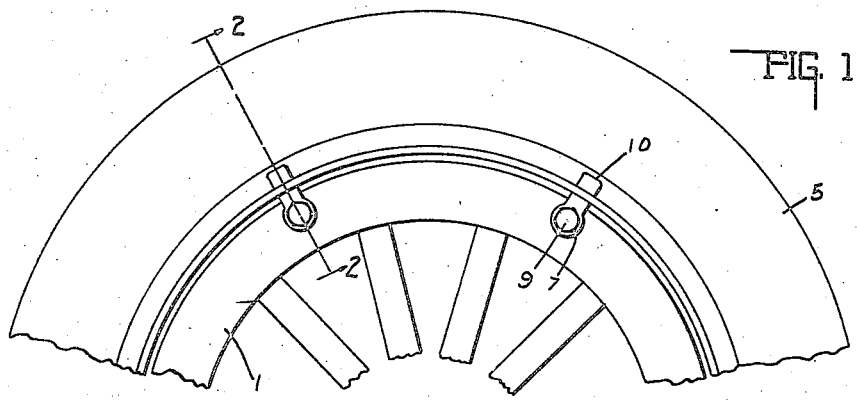
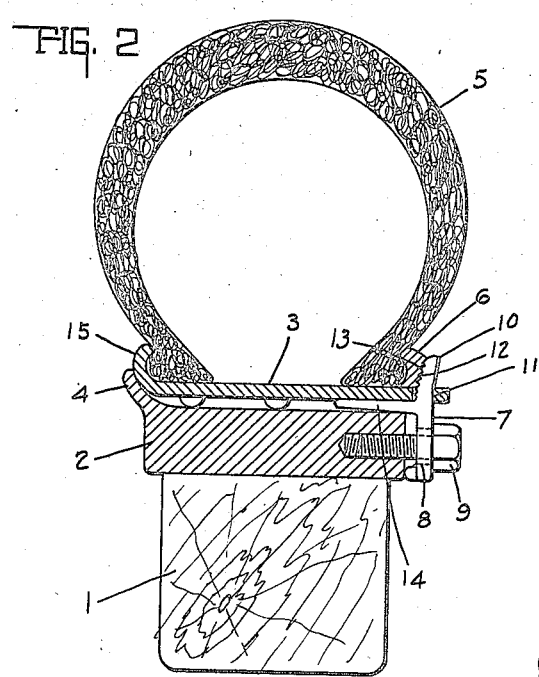
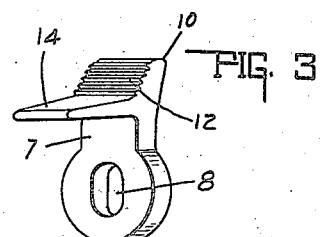
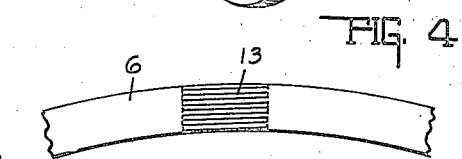
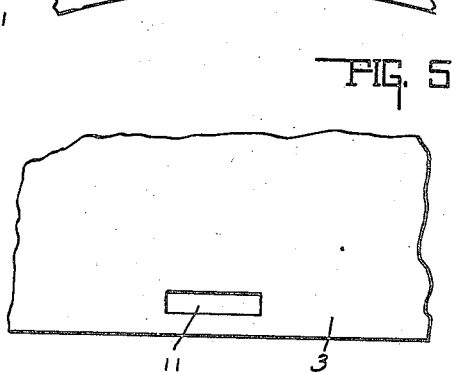
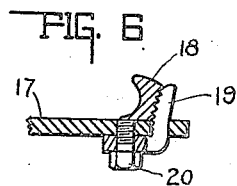
INVENTOR.
LAWRENCE P. WORRALL
BY
ATTORNEYS

UNITED STATES PATENT OFFICE.

LAWRENCE P. WORRALL, OF INDIANAPOLIS, INDIANA.

MEANS FOR ATTACHING TIRES TO DEMOUNTABLE RIMS.

1,403,141. Specification of Letters Patent. Patented Jan. 10, 1922.

Application filed July 31, 1920. Serial No. 400,387.

*To all whom it may concern:*

Be it known that I, LAWRENCE P. WORRALL, a citizen of the United States, residing at Indianapolis, in the county of Marion and State of Indiana, have invented certain new and useful Improvements in Means for Attaching Tires to Demountable Rims, of which the following is a specification.

This invention relates to means for attaching tires to wheel rims, and the prime feature of the invention is the provision of a locking ring for holding the tire to the rim, said ring being removable whereby the tire may be introduced onto or removed from the rim without collapsing the rim.

A further feature of the invention is the provision in connection with the lug for holding the rim onto the felloe, of means for locking the ring in operative position, the lug having an extension thereon which enters a slot in the rim and holds the locking ring against outward movement, the meeting faces of the ring and the extension of the lug preferably having serrations or milled faces which tend to hold the extensions on the lug from casually leaving the openings in the rim.

A further feature of the invention is in so arranging the parts that they can be used in connection with wire wheels which do not have the demountable rim.

Other objects and advantages will hereinafter be more fully set forth and pointed out in the accompanying specification.

In the accompanying drawings, which are made a part of this application,

Figure 1 is a detail side elevation of a portion of an automobile wheel showing the invention applied thereto, Figure 2, is an enlarged sectional view thereof as seen on line 2—2, Figure 1, Figure 3, is a perspective view of one of the rim locking lugs, Figure 4, is a fragmentary elevation of the outer face of the locking ring, Figure 5, is a fragmentary top plan view of the demountable wheel rim, and Figure 6, is a detail sectional view showing the device applied to use in connection with a wire wheel.

Referring to the drawings, 1 indicates the felloe of the wheel which may be of any preferred construction and having a metal face 2 upon which is to be introduced a demountable rim 3, one edge of the metal face 2 having a terminal flange 4 for limiting the movement of the demountable rim 3 in one direction.

Most demountable rims are so constructed that they can be collapsed or reduced in diameter in order to insert or remove the tire 5 therefrom, but when the meeting ends of the demountable rim become rusted it is very difficult to loosen said ends so that the rim will collapse, and to overcome this objectionable feature the demountable rim 3 is formed in a continuous piece and a locking ring 6 provided for securing the tire on the rim, this ring being separate from the rim so that it may be readily slipped over the free edge of the rim and into engagement with one of the beads of the tire.

As is usual a locking lug 7 is employed for securing the demountable rim onto the metal portion of the felloe, the body of the lug having an opening 8 through which takes a bolt 9, said bolt being threaded into parts of the felloe for clamping the lug 7 in locked position, and thus forcing one edge of the rim against the flange 4. This lug, in the present instance, is also employed for securing the locking ring 6 in position on the rim 3, the upper end of the locking lug having an extension 10 which passes through a slot 11 in the demountable rim adjacent the free edge of the rim and by first moving the locking ring 6 inwardly on the demountable rim a sufficient distance so that the extension will pass exteriorly of the ring, said ring will be securely held against outward movement.

As the extension 10 is merely slipped through the slot the inner face of the extension 10 and the outer surface of the locking ring 6 is milled or provided with serrations 12 and 13 respectively, and owing to these roughened meeting surfaces the extension 10 will remain stationary even when the demountable rim 3 is removed from the felloe, and by placing an inwardly extending arm 14 on the locking lug 7 which passes between the metal face 2 on the felloe and the demountable rim 3, the interlocking parts will be held perfectly rigid when the lug is locked to the wheel structure.

With this form of device the tire may be quickly removed from the demountable rim and as readily replaced thereon, as it is but necessary to tap the outer projecting end of the extension 10 of the various locking lugs to release them from engagement with the locking ring and force them out of their respective slots when the locking ring can be lifted from off the demountable rim and the tire 5 then removed, and if desired the inner engaging face of each locking lug may be slightly tapered, as best shown in Figures 2 and 3. After the tire has been replaced or a new one substituted for an old one, the tire is placed over the free edge of the demountable rim and moved laterally onto the rim until one of the beads on the rim engages the outer channel 15 upon the demountable rim. The locking ring 6 is then introduced over the free edge of the rim and moved inwardly beyond the slots 11 through the rim when the extensions of the locking lugs are entered through the slots 11 until the arms 10 of the locking lugs engage the inner face of the demountable rim 3. As soon as the tire is inflated the pressure will force the locking ring against the extensions 10 with sufficient pressure to cause the locking ring to hold the extensions from casually leaving their respective slots. The demountable rim is then introduced over the felloe in the usual manner and the bolts 9 applied to the lugs 7, thus securely locking the demountable rim and tire onto the wheel structure.

This device is also applicable for use in connection with rims used on wire wheels or pressed steel wheels, as best shown in Figure 6 of the drawing, and in this instance the rim 17 is constructed the same as the demountable rim and has a locking ring 18 removably attached thereto. The locking device 19, in this instance, is made substantially L-shape the horizontally extending portion passing below the rim where it is attached to a bolt 20, the operation of the parts being the same as in the preceding views.

The invention claimed is:

1. The combination with an endless demountable rim, of a removable locking ring, locking lugs for said demountable rim, and means integral with and forming a part of the locking lugs for securing the locking ring in position on the rim, said integral means projecting through said rim and in the path of said ring.

2. The combination with a demountable rim for vehicle tires, of a locking ring adapted to pass over one edge of the demountable rim, lugs for securing the demountable rim in position, fixed extensions on said lugs adapted to extend through said rim and into the path of said ring for holding the ring in position on the rim.

3. The combination with a vehicle wheel and a demountable tire supporting rim co-operating therewith, of a locking ring adapted to pass over one edge of said rim for holding a tire in position on the rim, locking lugs for clamping said rim and tire onto said wheel, and means integral with said lugs projecting through said rim and into the outward path of said locking ring for holding the ring in position on the rim.

4. The combination with a wheel structure and a tire supporting demountable rim co-operating therewith, said rim having slots adjacent one edge thereof, of a locking ring adapted to pass over the edge of the demountable rim and inwardly beyond the slots therethrough, locking lugs for securing the demountable rim to the wheel structure, integral extensions on said lugs adapted to pass through said slots and prevent outward movement of the locking ring, and means on the meeting faces of said extensions and the locking ring for holding said extensions against casual removal from the slots.

In witness whereof, I have hereunto set my hand and seal at Indianapolis, Indiana, this 28th day of July, A. D. nineteen hundred and twenty.

LAWRENCE P. WORRALL. [L. S.]

Witnesses:
CAREY S. FRYE,
M. L. SHULER.